United States Patent
Hu et al.

(10) Patent No.: US 11,861,471 B2
(45) Date of Patent: *Jan. 2, 2024

(54) COMPUTER VISION IMAGE FEATURE IDENTIFICATION VIA MULTI-LABEL FEW-SHOT MODEL

(71) Applicant: DST Technologies, Inc., Kansas City, MO (US)

(72) Inventors: Hui Peng Hu, Berkeley, CA (US); Ramesh Sridharan, Oakland, CA (US)

(73) Assignee: DST Technologies, Inc., Kansas City, MO (US)

( * ) Notice: Subject to any disclaimer, the term of this patent is extended or adjusted under 35 U.S.C. 154(b) by 11 days.

This patent is subject to a terminal disclaimer.

(21) Appl. No.: 17/644,774

(22) Filed: Dec. 16, 2021

(65) Prior Publication Data

US 2022/0172500 A1 Jun. 2, 2022

Related U.S. Application Data

(63) Continuation of application No. 16/678,982, filed on Nov. 8, 2019, now Pat. No. 11,238,275.

(51) Int. Cl.
*G06K 9/00* (2022.01)
*G06N 20/00* (2019.01)
*G06F 17/16* (2006.01)
*G06V 30/414* (2022.01)
*G06F 18/214* (2023.01)
(Continued)

(52) U.S. Cl.
CPC ............. *G06N 20/00* (2019.01); *G06F 17/16* (2013.01); *G06F 18/214* (2023.01); *G06N 3/045* (2023.01); *G06V 10/40* (2022.01); *G06V 10/75* (2022.01); *G06V 10/764* (2022.01);
(Continued)

(58) Field of Classification Search
CPC .. G06K 9/00463; G06K 9/6256; G06N 20/00; G06N 3/0454; G06F 17/16
See application file for complete search history.

(56) References Cited

U.S. PATENT DOCUMENTS 5,274,714 A * 12/1993 Hutcheson ........... G06V 30/194
382/280
2008/0025596 A1 1/2008 Podilchuk
(Continued)

OTHER PUBLICATIONS

Sung F, Yang Y, Zhang L, Xiang T, Torr PH, Hospedales TM. Learning to compare: Relation network for few-shot learning. InProceedings of the IEEE conference on computer vision and pattern recognition 2018 (pp. 1199-1208). (Year: 2018).*
(Continued)

*Primary Examiner* — Fayyaz Alam
(74) *Attorney, Agent, or Firm* — Perkins Coie LLP; Colin Fowler; Brian Coleman (57) ABSTRACT

A technique making use of a few-shot model to determine graphical features present in an image based on a small set of examples with known graphical features. Where a support set including a number of images that each have a known combination of graphical features, the image recognition can identify unknown combinations of those graphical features in any number of query images. In an embodiment of the present disclosure examples of a filled-out form are used to interpret any number of additional filled out versions of the form.

20 Claims, 8 Drawing Sheets

(51) Int. Cl.
  *G06N 3/045* (2023.01)
  *G06V 10/75* (2022.01)
  *G06V 10/764* (2022.01)
  *G06V 10/77* (2022.01)
  *G06V 10/82* (2022.01)
  *G06V 10/40* (2022.01)

(52) U.S. Cl.
  CPC .......... *G06V 10/7715* (2022.01); *G06V 10/82* (2022.01); *G06V 30/414* (2022.01)

(56) References Cited

U.S. PATENT DOCUMENTS

| | | | |
|---|---|---|---|
| 2012/0029908 A1* | 2/2012 | Takamatsu | G06F 40/30 704/9 |
| 2017/0344823 A1 | 11/2017 | Withrow et al. | |
| 2020/0104677 A1* | 4/2020 | Rae | G06N 3/084 |
| 2020/0118043 A1* | 4/2020 | Venkataramani | G06V 10/776 |
| 2020/0134056 A1 | 4/2020 | Sarkar et al. | |
| 2020/0175564 A1* | 6/2020 | Kulasooriya | G06F 16/285 |
| 2020/0242736 A1* | 7/2020 | Liu | G06T 3/60 |
| 2020/0410397 A1 | 12/2020 | Chae | |
| 2021/0073890 A1 | 3/2021 | Lee et al. | |
| 2021/0089880 A1* | 3/2021 | Karlinsky | G06F 16/285 |
| 2021/0149931 A1* | 5/2021 | Iliadis | G06F 16/93 |
| 2021/0272088 A1* | 9/2021 | Srivastava | G06F 16/55 |

OTHER PUBLICATIONS

Chen WY, Liu YC, Kira Z, Wang YC, Huang Jb. A closer look at few-shot classification. arXiv preprint arXiv: 1904.04232. Apr. 8, 2019. (Year: 2019).*

Dhillon GS, Chaudhari P, Ravichandran A, Soatto S. A baseline for few-shot image classification. arXiv preprint arXiv:1909.02729. Sep. 6, 2019. (Year: 2019).*

Hui B, Zhu P. Hu Q, Wang Q. Self-attention relation network for few-shot learning. In2019 IEEE international conference on Multimedia & Expo Workshops (ICMEW) Jul. 8, 2019 (pp. 198-203). IEEE. (Year: 2019).*

* cited by examiner

|  | Frog | Cat | Dog | N |
|---|---|---|---|---|
| Image A | 1 | 0 | 1 | ... |
| Image B | 1 | 1 | 0 | ... |
| Image C | 0 | 0 | 1 | ... |
| Image n | ... | ... | ... | ... |

Graphic Features Matrix 38

Image A 22

Image B 24

Image C 26

Query 28

Health Alliance Medical Plans
Attn: Illinois Pre-existing
Insurance Plan (IPXP)
301 S. Vine St.
Urbana, Il 61801-3347
1-877-210-9167

Qualifying Pre-existing Medical Condition Certification Form

Please print all information.
The "Physician's Certification" section of this form must be completed by your physician.
This completed form must be returned with your application.

Name: ___________________________  ___________________________  ___________________________
       last                          first                        middle Address: _______________________________ City: _____________ State: _______ Zip: _______

Day-Time Telephone Number: _______________________

Primary Applicant's Signature: _______________________________ Date *(MM/DD/YY)*: _______

Signature of Parent/Legal Guardian: _______________________________________________
*(if applicant is under age 18 or legally incompetent)*

Physician's Certification

Physician's Name: ___________________________  ___________________________  ___________________________
                  last                          first                        middle Physician's NPI _______________________  The person has been my patient since *(MM/DD/YY)*: _______

Physician: Please indicate below, the patient's primary pre-existing medical condition. Select all that apply.

- ☐ AIDS or AIDS-Related Complex (ARC)
- ☐ Angina Pectoris
- ☐ Arteriosclerosis Obliterans
- ☐ Cerebrovascular Accident (Stroke)
- ☐ Chemical Dependency
- ☐ Cirrhosis of the Liver
- ☐ Coronary Insufficiency
- ☐ Coronary Occlusion
- ☐ Cystic Fibrosis
- ☐ Friedreich's Ataxia
- ☐ Hemophilia (Classical)
- ☐ Hodgkin's Disease
- ☐ Huntington's Chorea
- ☐ Juvenile Diabetes
- ☐ Kidney Failure Requiring Dialysis
- ☐ Leukemia

- ☐ Lupus Erythematosus Disseminate
- ☐ Metastatic Cancer
- ☐ Multiple or Disseminated Sclerosis
- ☐ Muscular Atrophy or Dystrophy
- ☐ Myasthenia Gravis
- ☒ Myotonia
- ☐ Paraplegia or Quadriplegia
- ☐ Parkinson's Disease
- ☐ Poliomyelitis
- ☐ Polycystic Kidney
- ☐ Severe Traumatic Brain Injury
- ☐ Sickle Cell Anemia
- ☐ Silicosis Pneumonoconiosis (Black Lung)
- ☐ Syringomyelia
- ☐ Wilson's Disease
- ☐ Other (indicate diagnosis or ICD-9 Code): _______________

I hereby certify that the responses as recorded above are full, complete and true to the best of my knowledge and belief.

Physician's Signature: _______________________________  Date *(MM/DD/YY)*: _______

PMCCF 5.10
aso-Ipxpmedllstform-0810

COMPUTER VISION IMAGE FEATURE IDENTIFICATION VIA MULTI-LABEL FEW-SHOT MODEL

CROSS-REFERENCE TO RELATED APPLICATION

This application is a continuation of U.S. patent application Ser. No. 16/678,982 filed Nov. 8, 2019, which is incorporated by reference herein in its entirety.

TECHNICAL FIELD

The disclosure relates to artificial intelligence models and specifically those that are trained to evaluate a small batch of input.

BACKGROUND

Artificial intelligence models often operate based on extensive and enormous training models. The models include a multiplicity of inputs and how each should be handled. Then, when the model receives a new input, the model produces an output based on patterns determined from the data it was trained on. Few-shot models use a small number of inputs (a support set) to identify some information about a query input.

BRIEF DESCRIPTION OF THE DRAWINGS

FIG. 7 is a depiction of a form template that the present disclosure may be applied to.

DETAILED DESCRIPTION

Embodiments disclosed herein include a computer vision model that identifies a combination of graphic elements present in a query image based on a support set of images that include other various combinations of the graphic features. The term "few-shot" refers to a model that is trained to interpret a few sources of input data that the model has not necessarily observed before. Few-shot is shorthand for stating that the model has "a few shots" to determine what the user is seeking. "A few" does not necessarily refer to "three" as is often applied, but a relatively small number when compared to other models known in the art. Few-shot learning (FSL) refers to the training of machine learning algorithms using a very small set of training data (e.g. a handful of images), as opposed to the very large set that is more often used. This commonly applies to the field of computer vision, where it is desirable to have an object categorization model work well without thousands of training examples.

FSL is utilized in the field of computer vision, where employing an object categorization model still gives appropriate results even without having several training samples. For example, where a system categorizes bird species from photos, some rare species of birds may lack enough labeled pictures to be used as training images. Consequently, if there is a classifier for bird images, with the insufficient amount of the dataset, a solution would employ FSL.

In some embodiments, a few-shot model uses 10 or fewer input examples, 20 or fewer, 100 or fewer input examples, or 5-7 input examples. When applied to graphic feature identification, the number of input examples may be directly correlated with the number of graphic features that are possible in queries. The referenced input examples differ from those the model is trained with in that those examples used during the few-shot do not necessarily have any relationship (with the exception of having a comparable data type, like the use of ASCII characters, or image data). The training of the model is premised in teaching the model how to quickly adapt to new training examples, rather than to recognize a given input strictly based on examples that it has seen during training. Rather than evaluate individual inputs, the few-shot model is trained to evaluate few-shots—specifically relationships that exist between the various examples within the few-shot.

An example embodiment of the present disclosure is that of evaluating which graphic features of a set of graphic features appear in a query image. If the few-shot includes a set of examples including a set of forms with various check boxes clicked (e.g., a pre-existing condition form). A model determines commonality between the query image and the support set (e.g. are there check boxes that match those in the support set?). A derivation of the exact graphic features present in the query image is based on identified overlap of graphic features of images in the support set.

Previous work on few-shot learning requires that each example in the support set (examples for the model to adapt quickly to) contain only a single label. For example, suppose a model can quickly learn to classify images of a rare bird species. Prior work requires that each image in the support set contain a single bird. Other work relating to few-shot models and relation network models include the following references:

Yutian Chen, Yannis M. Assael, Brendan Shillingford, David Budden, Scott E. Reed, Heiga Zen, Quan Wang, Luis C. Cobo, Andrew Trask, Ben Laurie, Çaglar Gülçehre, Aäron van den Oord, Oriol Vinyals, and Nando de Freitas. *Sample Efficient Adaptive Text-to-Speech*. CoRR, abs/1809.10460, 2018.

Chelsea Finn, Pieter Abbeel, and Sergey Levine. *Model-Agnostic Metalearning for Fast Adaptation of Deep Networks*. CoRR, abs/1703.03400, 2017.

Gregory R. Koch. *Siamese Neural Networks for One-Shot Image Recognition*. 2015.

Scott E. Reed, Yutian Chen, Thomas Paine, Aaron van den Oord, S. M. Ali Eslami, Danilo Jimenez Rezende, Oriol Vinyals, and Nando de Freitas. *Few-shot Autoregressive Density Estimation: Towards Learning to Learn Distributions*. CoRR, abs/1710.10304, 2017.

Florian Schroff, Dmitry Kalenichenko, and James Philbin. *Facenet: A Unified Embedding for Face Recognition and Clustering*. CoRR, abs/1503.03832, 2015.

Flood Sung, Yongxin Yang, Li Zhang, Tao Xiang, Philip H. S. Torr, and Timothy M. Hospedales. *Learning to Compare: Relation Network for Few-shot Learning*. CoRR, abs/1711.06025, 2017.

Oriol Vinyals, Charles Blundell, Timothy P. Lillicrap, Koray Kavukcuoglu, and Daan Wierstra. *Matching Networks for One Shot Learning*. CoRR, abs/1606.04080, 2016.

Figure 1:
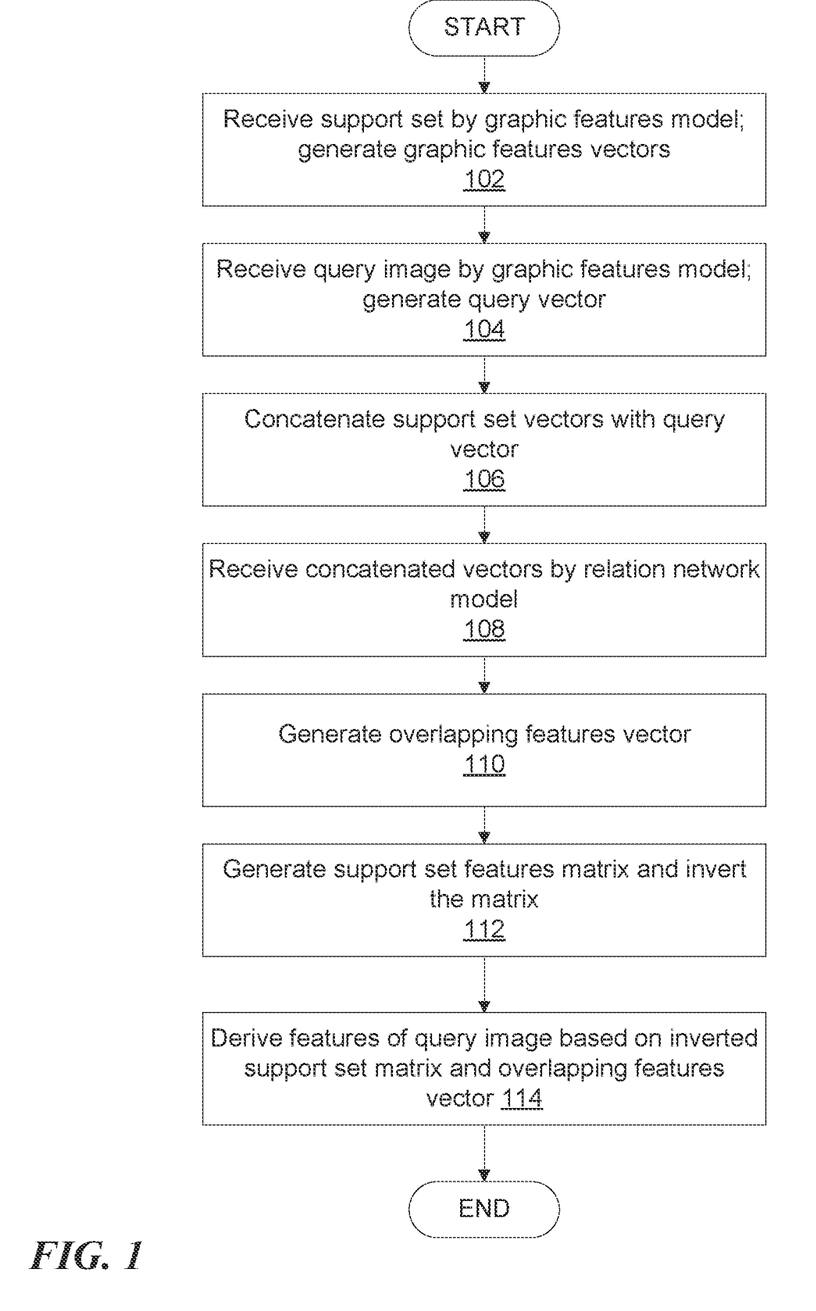
FIG. 1 is a flowchart illustrating a method of deriving a combination of graphical features present in a query image.

FIG. 1 is a flowchart illustrating a method of deriving a combination of graphical features present in a query image. In step 102, a graphic features model receives a support set of images including known graphic features and generates graphic features vectors. The graphic features vectors are representations of the corresponding images within the support set. The graphic features model generates the graphic features vectors to be reflective of the graphic features of those images. In some embodiments, the graphic features vectors are binary.

The same graphics features model is used to identify graphic features of a query image. In some embodiments the receipt of the support set is supervised in that the graphic features model is informed what the relevant graphic features of the support set are. In some embodiments, the graphic features model is unsupervised, and the graphic features vectors associated with the support set are interpreted at a later step based on the known content of the support set.

In step 104, the graphic features model receives a query image and generates a query vector. The graphic features model similarly vectorizes the query image. The query vector includes data reflective of the graphic features of the query image.

In step 106, the image identification system concatenates the query vector to each of the graphic features vectors. In step 108, a relation network model receives the concatenated vectors. In step 110, the relation network model generates an overlapping features vector from the combination of the concatenated vectors. The overlapping features vector includes data reflective of a number of graphic features that the query image has in common with each of the respective support set images.

In step 112, the image recognition system generates a support set features matrix and inverts that matrix. The support set features matrix includes data reflective of the graphic features included in the whole of the support set. In some embodiments, the graphic features matrix is a combination of support set graphic features vectors combined as rows in the matrix. Because the support set matrix is inverted, the matrix must have a rank equal to the number of categories (full rank matrix). In cases where the matrix not full rank, or in cases where we have more images than a full rank, the pseudo-inverse can be used instead. However, without a full-rank matrix, the problem can no longer be solved deterministically.

In step 114, the image recognition system derives the graphical features present in the query image based on a relationship between support set matrix and the overlapping features vector. The features of the query image multiplied by the support set matrix generates an overlapping features vector. Thus, multiplying the overlapping features vector by an inverted version of the support set matrix generates a vector indicating the graphical features in the query image.

Figure 2:
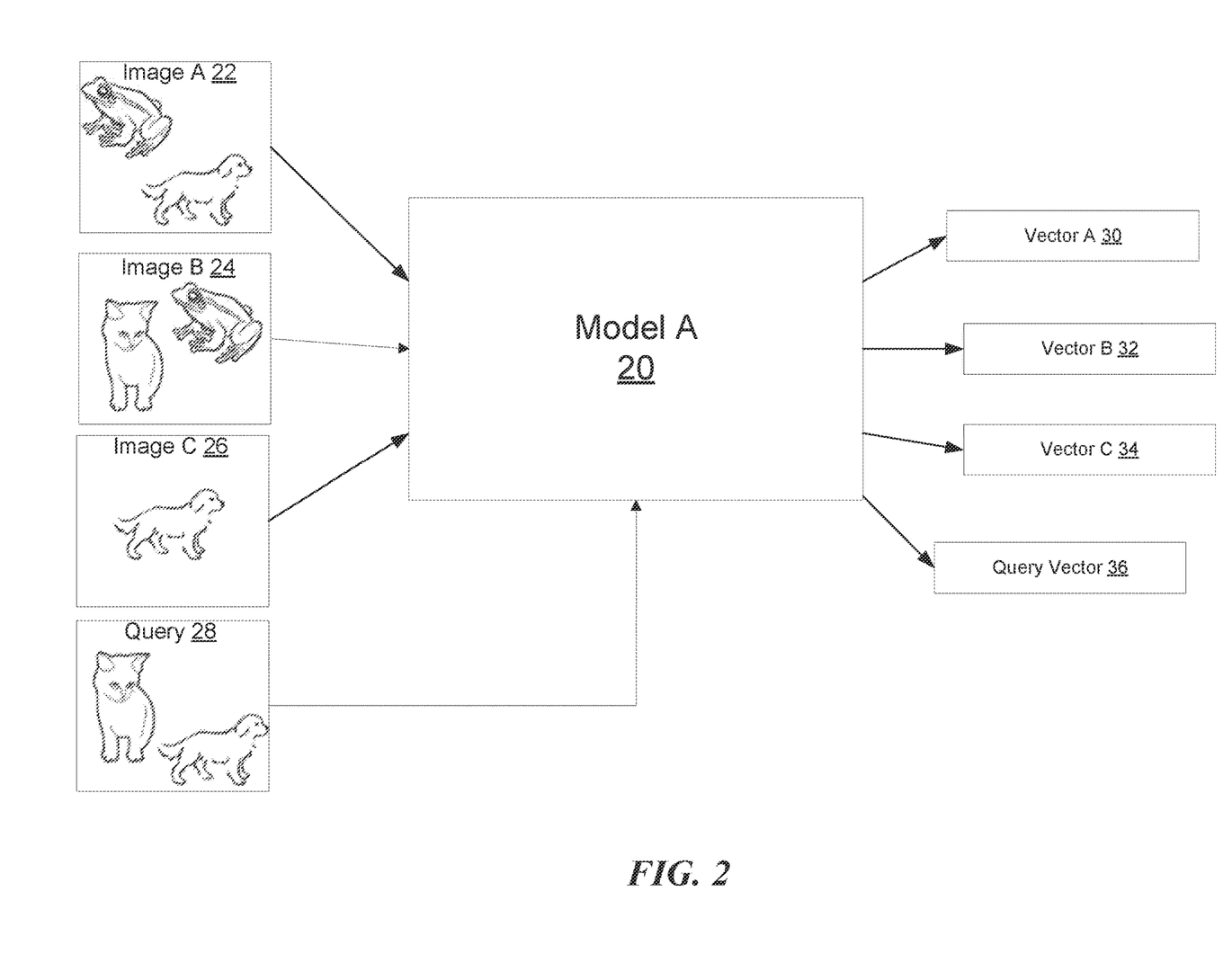
FIG. 2 is an illustration of a sample few-shot model configured to derive graphic features.

FIG. 2 is an illustration of a sample few-shot model 20 configured to derive graphic features. The sample illustrated is a simplistic implementation utilizing relatively few, and easy to recognize graphic features. This disclosure is not limited to such simple implementations and the relevant models may be configured to operate and identify more complex sets of graphic features.

In the example, Model A 20, is a few-shot model designed to identify and categorize graphic features that are received. In some embodiments, Model A 20 is configured with a set list of graphic features to observe (indicated by a graphic feature matrix). In other embodiments, Model A 20 includes no explanation what a support set includes and instead merely identifies similar patterns in pixels. Few-shot models that describe identification of a similar "language" where the language may be letters, or pictures or any like-with-like manner of representing information, are disclosed in co-pending U.S. patent application Ser. No. 16/413,159, entitled "FEW-SHOT LANGUAGE MODEL TRAINING AND IMPLEMENTATION" and filed on May 15, 2019.

The illustration of FIG. 2 includes a three-image support set 22, 24, 26 and a single query image 28. The images include some combination of three graphical features depicting a frog, a cat, or a dog. When each image 22, 24, 26, 28 is supplied to Model A 20, Model A 20 generates a respective vector that describes the image content. Each vector 30, 32, 34, 36 includes a set of dimensions that together are indicative of the graphic content of the images 22, 24, 26, 28. Image A 22 corresponds to Vector A 30. Image B 24 corresponds to Vector B 32. Image C 26 corresponds to Vector C 34. The query image 28 corresponds to the query vector 36. In some embodiments, the support set vectors 30, 32, 34 and the query vector 36 are 128 dimensions in length. Dimensions may relate directly to graphical features on a one-to-one basis, or multiple dimensions may be used to describe a given graphic feature.

As depicted in the figure, the query image 28 does not include a combination of graphic features that exist in any of the support set. Each feature exists in the support set, but not necessarily by itself, or with an exact same combination. While a human observer can readily identify the content of the query image, the image identification system is taught how to identify via few-shot models.

Figure 3:
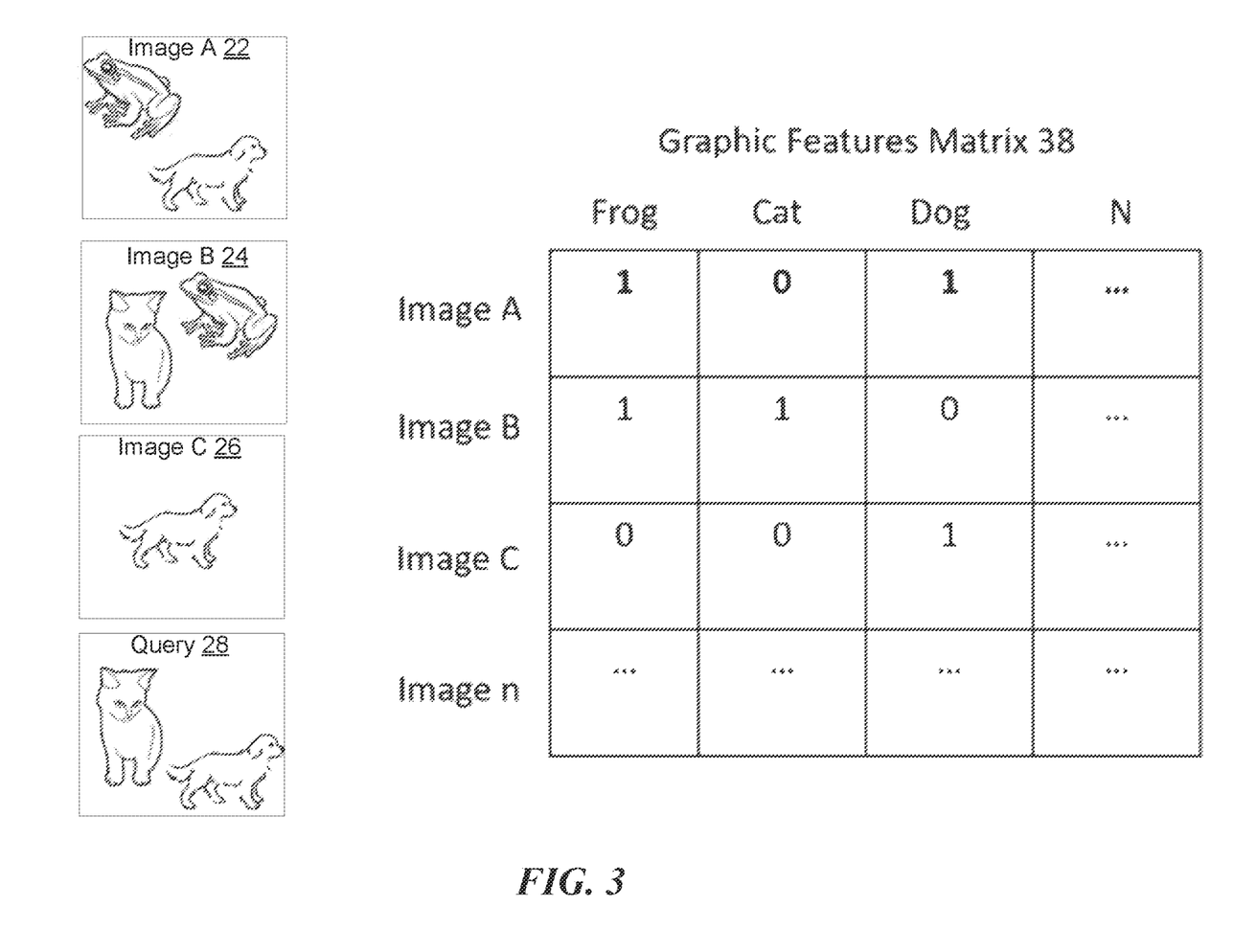
FIG. 3 is an illustration of a graphic features matrix as corresponding to a support set.

FIG. 3 is an illustration of a graphic features matrix 38 as corresponding to a support set 22, 24, 26. In some embodiments, the graphic features matrix 38 is provided as input into Model A as a binary truth table illustrating the presence of graphic features in support set images. In some embodiments, where the support set vectors 30, 32, 34 are also binary, combining the corresponding vectors 30, 32, 34 generated for the support set 22, 24, 26 as rows in is the same as the matrix 38.

As evident from FIG. 3, the graphic features matrix 38 is a binary matrix where columns reference specific graphic features and rows refer to images. A cell that includes a "1" indicates that the corresponding image includes the corresponding graphic feature. While the illustrated support set includes only images A, B and C, any number of images (n) could be supplied in a support set. Similarly, three graphic features are depicted in the figure, but any number of graphic features (N) may be included. The graphic features matrix 38 is full-rank. The matrix 38 is either invertible or pseudo-invertible. Ability to invert or pseudo-invert the graphic features matrix 38 is the only restriction on the values of "n" or "N."

Image A 22 includes a frog and a dog, thus the graphic features matrix 38 indicates that each of those features are present. Similar data is included regarding image B 24 and Image C 26. The row depicting the data included in the query image 28 is not a part of the graphic features matrix 38 as pertaining to the inversion requirement of the matrix 38. The image identification system is limited in identifying graphic features that exist in the support set. Graphic features that exist external to the support set cannot be identified. For example, if the query image included a cow graphic feature, Model A 20 (and subsequent models) would identify the existence of a graphic feature, but without a cow present in the support set, the models would be unable to determine that the present graphic feature was a cow. In some embodiments the graphic features matrix 38 includes an additional unknown graphic feature to accommodate for the potential that the query image 28 includes graphic features that are not present within the support set 22, 24, 26.

Figure 4:
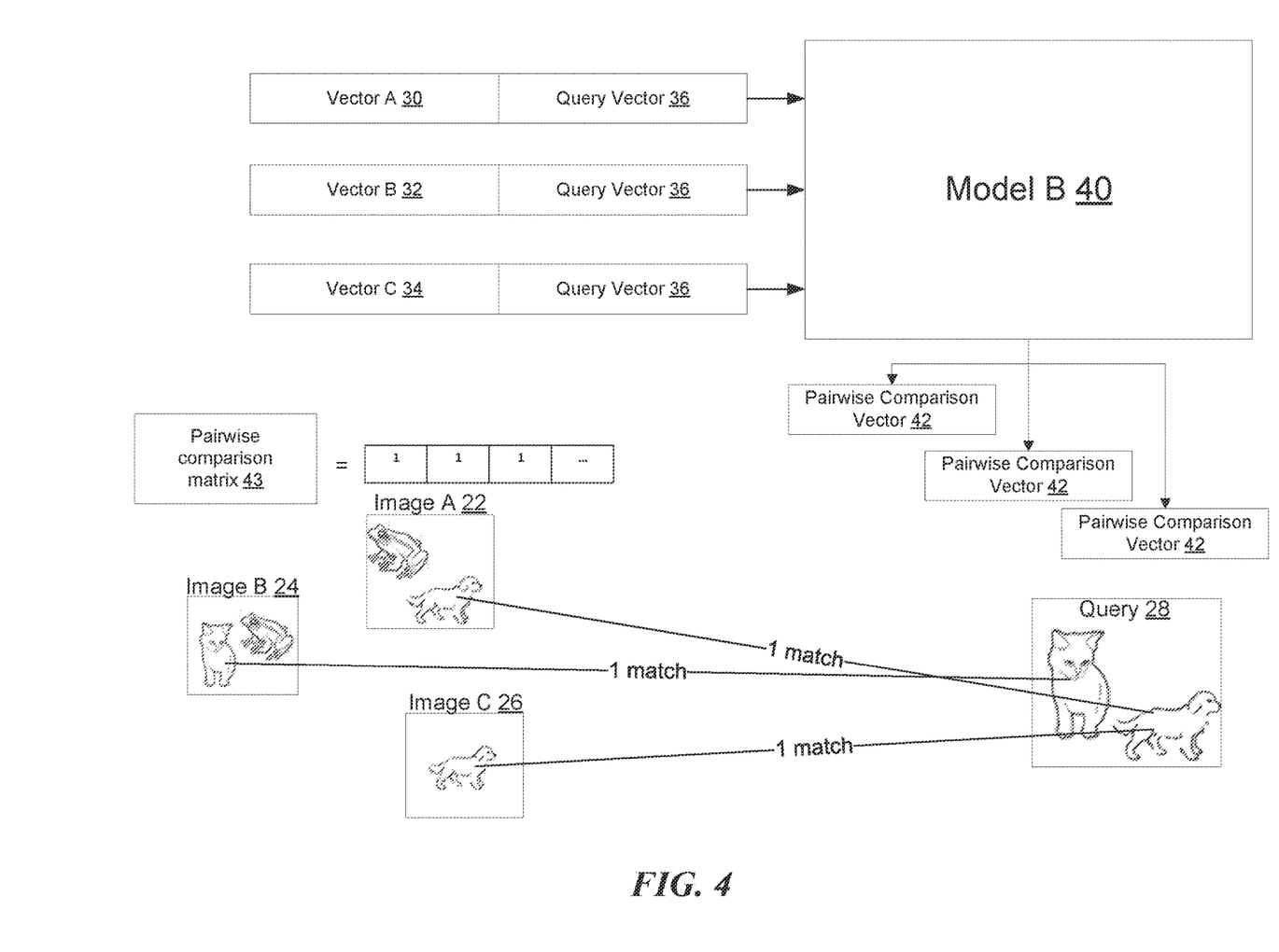
FIG. 4 is an illustration of a sample relation network model generating a pairwise comparison of the sample set and the query image.

FIG. 4 is an illustration of a sample relation network model 40 generating a pairwise comparison 42 of the sample set 22, 24, 26 and the query image 28. Model B 40 is a relation network that performs a pairwise comparison. To prepare input for Model B 40, the query vector 36 is concatenated to each of the vectors associated with the support set 30, 32, 34. The concatenated vectors are input into Model B 40 together. In embodiments where the vectors 30, 32, 34, 36 are 128 dimensions in length, the concatenated vectors are 256 dimensions in length.

Model B 40 is a relation network model and performs a pairwise comparison of the components of the concatenated vectors. Each concatenated vector corresponds to a resulting pairwise comparison vector 42. The pairwise comparison vector 42 includes a signal of how similar the query image 28 is to the corresponding support set vector 30, 32, 34. In some embodiments, a combination of each pairwise comparison vector 42 (into a matrix) is multicable with the inverse of graphic features matrix 38. In some embodiments, the pairwise comparison vector 42 indicates a number of overlapping features between the query image 28 and the respective support set image 22, 24, 26. Where the pairwise comparison vector 42 indicates the number of overlaps, the pairwise comparison vector 42 has a length of 1.

In an example where each pairwise comparison vector 42 indicates the number of graphic feature overlaps, the query image 28 includes one overlapped graphic feature with each support set image 22, 24, 26. Both the query image 28 and image A 22 include a dog (one overlap). Both the query image 28 and image B 24 include a cat (one overlap). Both the query image 28 and image C 26 include a cat (one overlap). In the example, a combination of each pairwise comparison vector 42 into a pairwise comparison matrix 43 is (1,1,1). While this particular pairwise comparison matrix 43 has width 1 and could be described as a vector, the width is not necessarily fixed at 1, and in other examples would not be 1. The pairwise comparison vector 42 or matrix 43 are not necessarily binary. Where there are multiple overlaps, the overlap count cannot be represented by a single bit.

In some embodiments, a given graphical feature is not necessarily represented by a single integer. Similarly, in some embodiments, the pairwise comparison vector 42 does not indicate a single pairwise comparison between a given support set image, and the query image 28 with a single cell/position in the pairwise query vector 42. A one-to-one correspondence is used in the figures merely to illustrate an example.

In other embodiments, the pairwise comparison vector 42 has an arbitrary length including sufficient elements to describe a similarity signal between the relevant components of the input concatenated vector. In some embodiments the arbitrary length matches the query vector 36 and the support set vectors 30, 32, 34 (e.g., length of 128).

Figure 5:
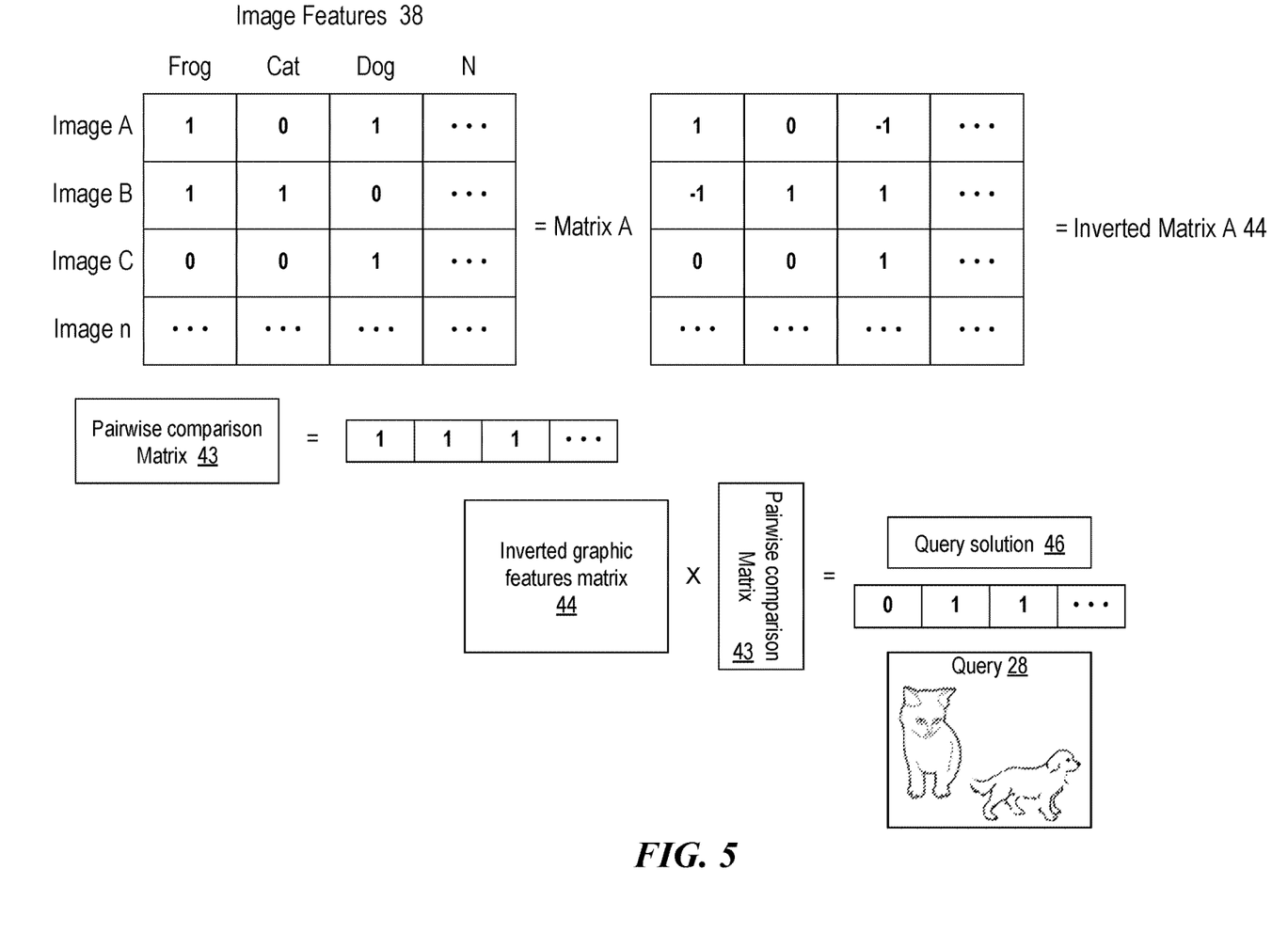
FIG. 5 is an illustration of a derivation of the combination of graphical features present in a query image.

FIG. 5 is an illustration of a derivation of the combination of graphical features present in a query image 28. Given that:

(1) The graphic features matrix 38, representing the graphical features present in the support set is [A];

(2) The unknown or uninterpreted vector representing the combination of graphical features present in the query image 28 is [B]; and (3) a matrix 43 indicating a degree of similarity between graphic features of query image 28 and a support set of images 22, 24, 26 is [C] (in some embodiments [C] indicates a number of overlaps); then $[A] \times [B] = [C]$. However [B] is not initially known information and is what the model ultimately predicts. To solve for [B], the relevant equation is $[A]^{-1} \times [C] = [B]$. Where an inverse of [A] is unavailable, a pseudo-inverse is used instead. Where the pairwise comparison vectors 42 and the subsequent pairwise comparison matrix 43 describe a degree of similarity (as opposed to a simple count of overlaps), $[A]^{-1}$ serves as a disentangling signal for [C]. The resultant [B] is a partial product (not in the same format as [A]) and is subjected to further processing. The additional processing is through a projection model (a third neural network)

Thus, to determine or interpret the combination of features in the query image 28, the image identification system first inverts the graphic features matrix 38. The inverted graphic features matrix 44 is multiplied by the pairwise comparison vector 42. The product is query solution vector 44. Where no inversion to the graphic features matrix 38 exists, a pseudo-inverse is performed instead.

In some embodiments, the algorithm involved to obtain the query solution vector 46 involves additional processing. Processing depends on the configured outputs of model A 20 and model B 40. Given information indicating the presence of graphical features in a support set and information indicating similarity between graphical features of a query image and individual support set images, a few-shot learning system is enabled to derive the combination of graphical features in the query image. The inverted graphical features matrix 44 and the pairwise comparison vector 42 may include additional post processing in order to derive the query solution vector 46. In some embodiments, the query solution vector 46 is subjected to further post processing to conform to a format of the graphical features matrix 38 (e.g., become human readable).

In some embodiments query vector 28 is an uninterpreted version of the query solution vector 46. The support set images 22, 24, 26 include metadata that indicate the graphical features present whereas the query vector 28 does not. The disclosed system and method solve for the difference. Where the pairwise comparison vector 42 is 128 dimensions and the graphical features matrix 38 is 128×128 dimensions, the query solution vector 46 is also 128 dimensions and does not necessarily include a one-to-one correlation between individual bits and graphical features.

Figure 6:
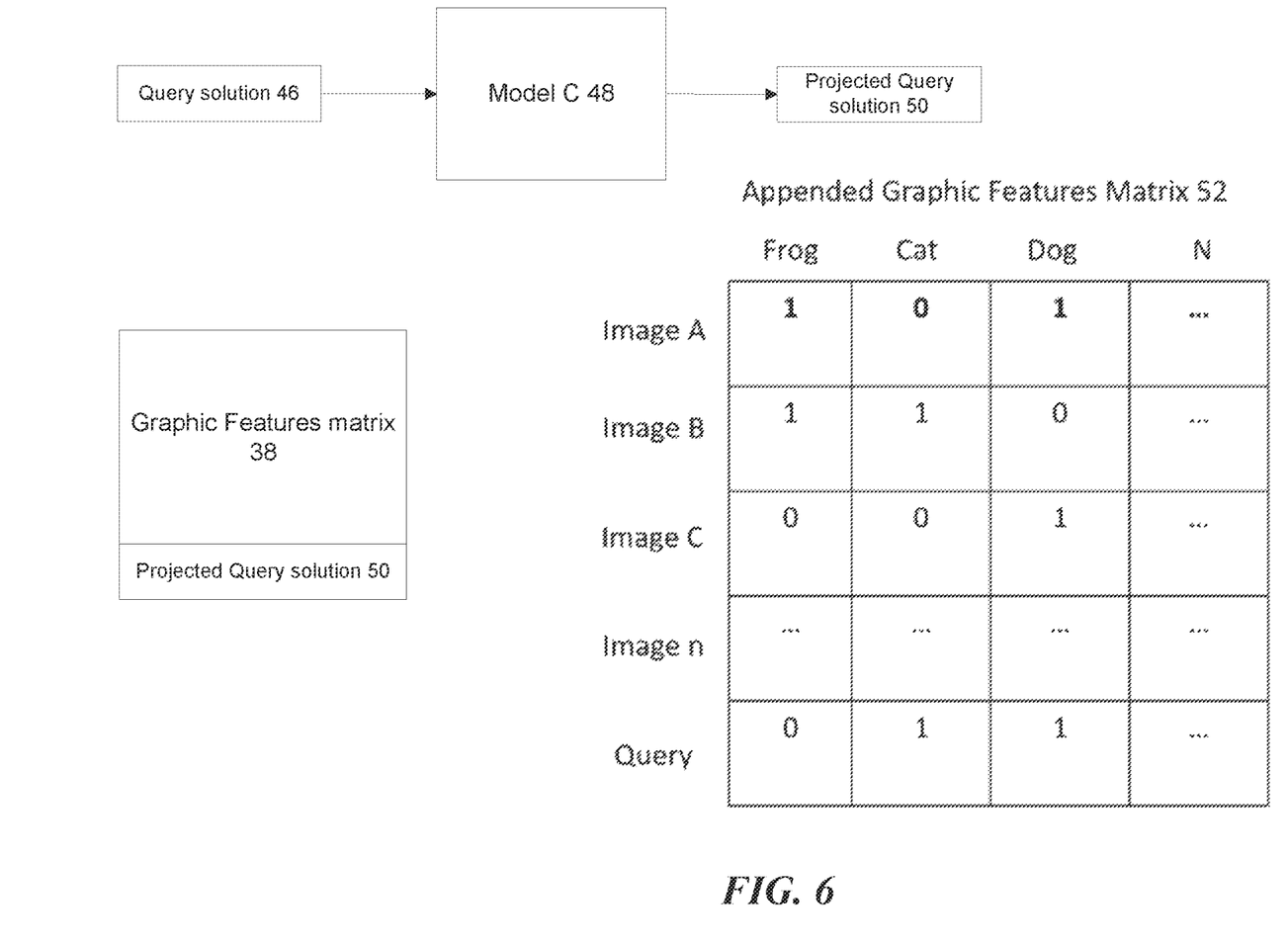
FIG. 6 is a block diagram illustrating a projection model applied to the query solution.

FIG. 6 is a block diagram illustrating a projection model applied to the query solution 46. Where the length of the pairwise comparison vectors 42 are arbitrary, and include data describing a degree of similarity between the query image 28 and each support set image 22, 24, 26 the above described equations require further manipulation and post processing. For example, where the graphic features matrix 38 is a 3×3 and the pairwise comparison matrix 43 is 3×128 (e.g., comprising three pairwise comparison vectors 42 of length 128), the resultant matrix is 3×128. That resultant matrix is not in the same format as the graphic features matrix 38 (e.g., cannot be appended to the bottom of the graphic features matrix 38 and be used as a table illustrating features present in the query).

A third model, model C 48 is used to project the query solution vector 46 into a projected query solution 50. Model C 48 is a neural network configured to project the data contained within the query solution vector 46 into a binary space that corresponds with the graphic features matrix 38 (e.g., in the illustrated example, that would correspond to a 3×1 matrix). The projected query solution 50 may be appended as an additional row on the graphic features matrix, thereby created an appended graphic features matrix 52 that may be read as a truth table regarding the graphic features present in all images. In some embodiments, Model C 48 multiplies the number of support set images×number of dimensions matrix (e.g., 3×128) by a number of dimensions×1 matrix (e.g., 128×1) in order to have a projected query solution 50 project into a preferred size.

Appending the projected query solution 50 to the graphics features matrix 38 is provided as an illustrative example indicating that the technique herein identifies the graphic content of the query image. It is unnecessary for the graphic content of the query to be represented in exactly the above described human readable format. Other human readable formats are suitable. The projected query solution 50 should be in any format that enables both a human and a computer to make actionable choices on the information.

Figure 7:
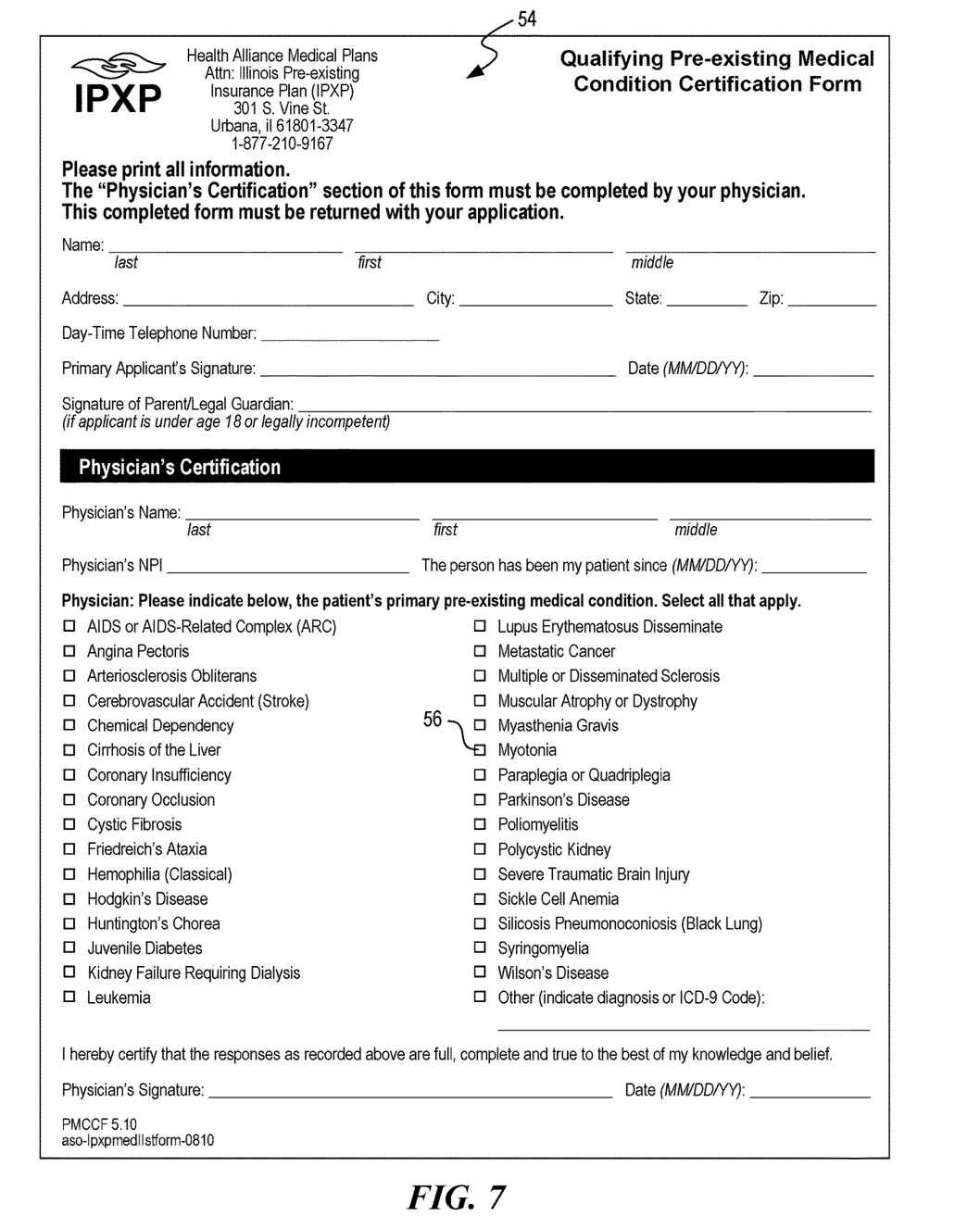

FIG. 7 is a depiction of a form template 54 that the present disclosure may be applied to. The sample form template 54 illustrated is one indicating pre-existing conditions in a medical context. This form is filled out by indicating via check boxes 56 whether the relevant person has listed conditions. When processing a large number of filled-out versions of the form template 54, given a support set of filled-out forms that include each checkbox marked at least once, the few-shot image identification model may identify which check boxes are marked in any number of unidentified forms in an efficient manner. A human intensive, or a more computationally complex computer vision process need only be used to generate a support set.

Figure 8:
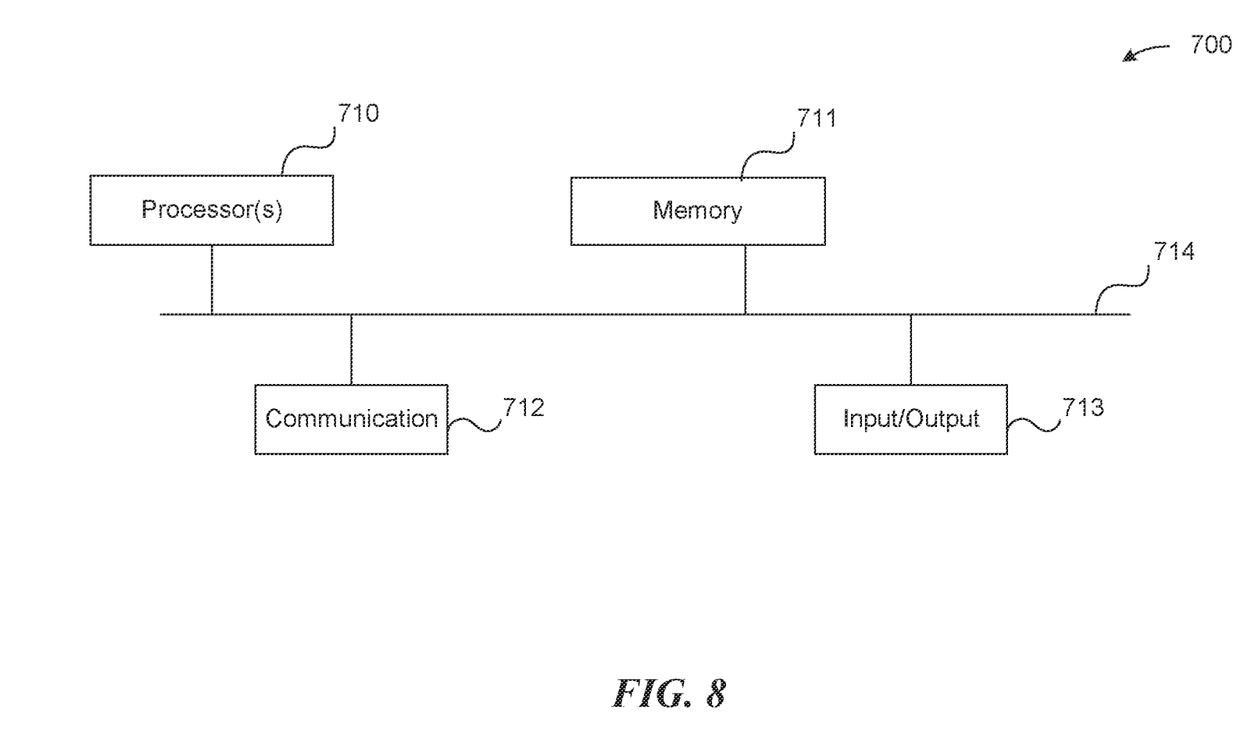
FIG. 8 is a high-level block diagram showing an example of a processing device that can represent a system to run any of the methods/algorithms described above.

FIG. 8 is a high-level block diagram showing an example of a processing device 800 that can represent a system to run any of the methods/algorithms described above. A system may include two or more processing devices such as represented in FIG. 8, which may be coupled to each other via a network or multiple networks. A network can be referred to as a communication network.

In the illustrated embodiment, the processing device 800 includes one or more processors 810, memory 811, a communication device 812, and one or more input/output (I/O) devices 813, all coupled to each other through an interconnect 814. The interconnect 814 may be or include one or more conductive traces, buses, point-to-point connections, controllers, scanners, adapters and/or other conventional connection devices. Each processor 810 may be or include, for example, one or more general-purpose programmable microprocessors or microprocessor cores, microcontrollers, application specific integrated circuits (ASICs), programmable gate arrays, or the like, or a combination of such devices. The processor(s) 810 control the overall operation of the processing device 800. Memory 811 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 811 may store data and instructions that configure the processor(s) 810 to execute operations in accordance with the techniques described above. The communication device 812 may be or include, for example, an Ethernet adapter, cable modem, Wi-Fi adapter, cellular transceiver, Bluetooth transceiver, or the like, or a combination thereof. Depending on the specific nature and purpose of the processing device 800, the I/O devices 813 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Physical and functional components (e.g., devices, engines, modules, and data repositories, etc.) associated with processing device 800 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip (e.g., software, software libraries, application program interfaces, etc.). The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodi-

The invention claimed is:

1. A method comprising:
   training a few-shot model with a few-shot data set, the few-shot data set including a number of images, each image of the number of images having a combination of graphic features, wherein the few-shot data set does not include every combination of the graphic features;
   generating a matrix of graphic features of the few-shot data set;
   receiving a query image by the few-shot model, the query image including a query combination of graphic features using graphic features found within the few-shot data set and represented by the matrix of graphic features; and
   identifying graphic features present in the query image via the few-shot model based on the matrix of graphic features.

2. The method of claim 1, further comprising:
   providing the few-shot model with a significant training data set that is unrelated to the specific graphic features of the query image.

3. The method of claim 1, further comprising:
   generating a query matrix of graphic features of the query image; and
   wherein said identifying graphic features is further based on the query matrix.

4. The method of claim 1, wherein each image of the few-shot data set and the query image are each a representation of a filled-out form document, the filled-out form documents adhering to a same form template, and the query combination of graphical features are check boxes positioned at predetermined locations on the form template.

5. The method of claim 1, wherein the query image includes an unknown combination of the graphical features that is not present within the few-shot data set.

6. The method of claim 1, further comprising:
   identifying a set of known graphical features of the few-shot data set via application of a computer vision model to each of the number of images.

7. The method of claim 1, further comprising:
   generating few-shot vectors based on each the number of images of the few-shot data set; and
   generating a query vector based on the query image.

8. The method of claim 7, further comprising:
   concatenating the query vector to each of the few-shot vectors resulting in combined vectors; and
   submitting each of the combined vectors to the few-shot model as input.

9. The method of claim 3, wherein said identifying is further based on a pairwise comparison that makes use of the query matrix and the matrix of graphic features.

10. A method of computer vision analysis of images that identifies graphical features in images via a few-shot model comprising:
    training a first machine learning model via a set of images, the set of images each including graphical features, wherein the set of images is a few-shot;
    for each image of the set of images, generating a respective vector representative of each of the set of images;
    inputting a query image to the trained machine learning model, the query image including a query combination of graphic features using graphic features found within the few-shot and represented by the matrix of graphic features;
    generating a query vector representative of the query image;
    performing a pairwise comparison based on the query vector and the respective vectors, wherein the pairwise comparison indicates flail graphical features in common between the query image and each of the set of images respectively; and
    deriving the graphical features present in the query image based on said pairwise comparison.

11. The method of claim 10, further comprising:
    providing the first model with a significant training data set that is unrelated to the graphical features present in the query image.

12. The method of claim 10, further comprising:
    concatenating the query vector to each of the respective vectors resulting in combined vectors; and
    submitting each of the combined vectors to the first model as input.

13. The method of claim 10, wherein each image of the set of images and the query image are each a representation of a filled-out form document, the filled-out form documents adhering to a same form template, and the graphical features are check boxes positioned at predetermined locations on the form template.

14. The method of claim 10, wherein the set of images includes at least one instance of each of the graphical features and the query image includes a combination of the graphical features that is not present within the set of images.

15. A system of computer vision analysis of images that identifies graphical features in images via a few-shot model comprising:
    a graphic features model configured to generate a set of vectors representative of graphical features in each of a few-shot set of images and a query image, where the graphical features present in the set of images are known graphical features to the graphical features model and the graphic features present in the query image are unknown to the graphics features model;
    a processor; and
    a memory including instructions configured to cause the processor to:
      training the graphic features model with a few-shot set of images, the few-shot set of images, each image of the set of images having a combination of graphic features, wherein the few-shot set of images does not include every combination of the graphic features;
      receiving the query image by the graphic features model, the query image including a combination of graphic features using known graphic features found in at least one image of the few-shot set of images; and
      identify graphic features present in the query image via the graphic features model based on the known graphical features.

16. The system of claim 15, wherein each image of the few-shot set of images and the query image are each a representation of a filled-out form document, the filled-out form documents adhering to a same form template, and the known graphical features are check boxes positioned at predetermined locations on the form template.

17. The system of claim 15, wherein the few-shot set of images includes at least one instance of each of the graphical features and the query image includes an unknown combination of the graphical features that is not present within the set of images.

18. The system of claim 15, the instructions further comprising:
   generating few-shot vectors based on each the few-shot set of images; and
   generating a query vector based on the query image.

19. The system of claim 18, the instructions further comprising:
   concatenating the query vector to each of the few-shot vectors resulting in combined vectors; and
   submitting each of the combined vectors to the graphic features model as input.

20. The system of claim 15, further comprising:
   a computer vision model configured to characterize the graphical features of the few-shot set of images.

* * * * *